Nov. 21, 1950  S. R. RICH  2,530,631
TIME INTERVAL MEASURING DEVICE
Original Filed April 16, 1948  2 Sheets-Sheet 1

INVENTOR
STANLEY R. RICH
BY
ATTORNEY

Nov. 21, 1950 S. R. RICH 2,530,631
TIME INTERVAL MEASURING DEVICE
Original Filed April 16, 1948 2 Sheets-Sheet 2
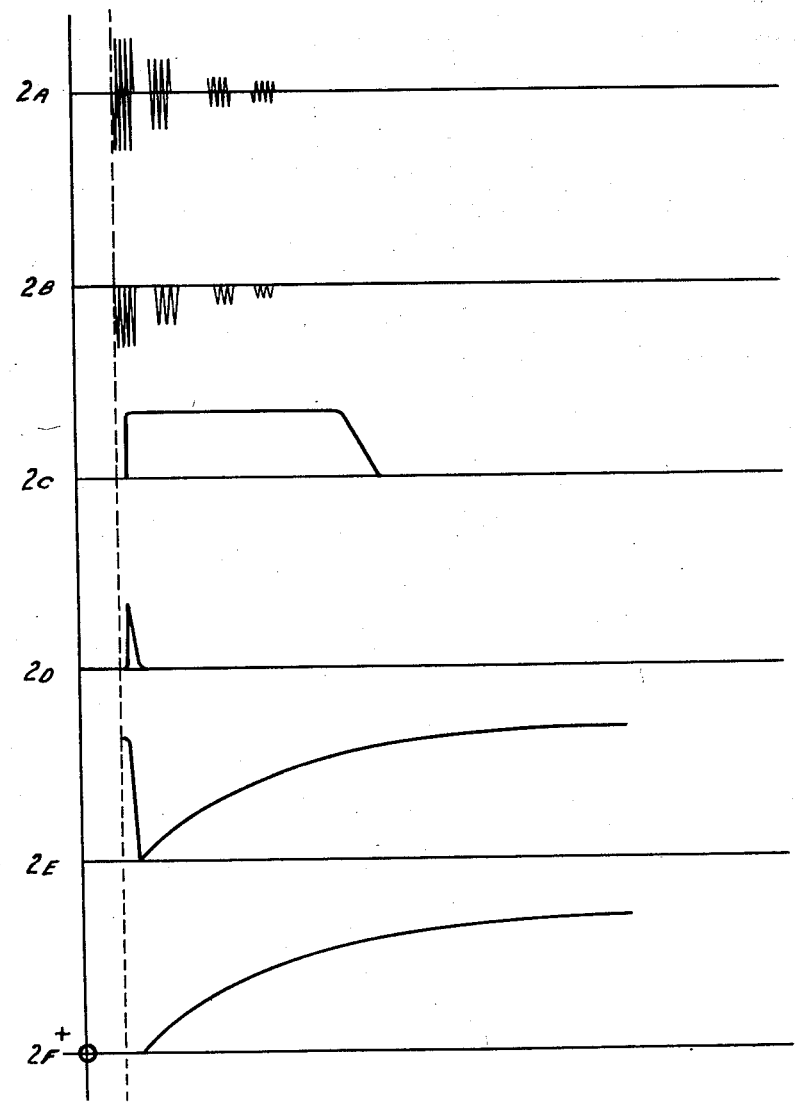
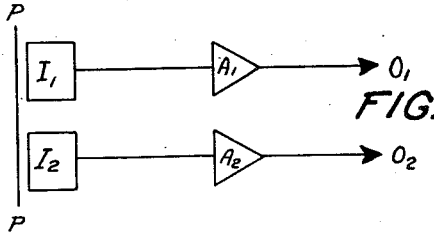
INVENTOR
STANLEY R. RICH
BY
ATTORNEY Patented Nov. 21, 1950

2,530,631

UNITED STATES PATENT OFFICE 2,530,631

TIME INTERVAL MEASURING DEVICE

Stanley R. Rich, Newton Center, Mass., assignor to Raytheon Manufacturing Company, a corporation of Delaware Original application April 16, 1948, Serial No. 21,422, now Patent No. 2,515,472, dated July 18, 1950. Divided and this application October 25, 1949, Serial No. 123,330

2 Claims. (Cl. 175—381)

This application is a division of my copending application, Serial No. 21,422, filed April 16, 1948, for Navigation Systems, now Patent No. 2,515,472.

The present invention relates to electrical circuits for indicating the order of arrival of two separate signals at an observation point, and the time interval between them. Signals of the kind contemplated are, for example, underwater sound signals received in two separate closely adjacent electroacoustic transducers. When a sound wave arrives at the transducers along a path perpendicular to the line joining them, electrical signals are simultaneously set up in them. On the other hand, when the path of arrival is different, one electrical signal precedes the other. A similar phenomenon occurs in radio reception, where two separate antennas may be used.

In accordance with the present invention, circuits are provided which furnish separate substantially identical channels, one for each of the electrical signals. In each channel there are means to initiate an electrical time measuring wave in response to the presence of the signal therein, and means functioning as a switch to control the passage of the timing wave to an indicator into which both channels feed. The time measuring waves are applied in sense opposition to the indicator. The switch means are both normally open. The signal of each channel is connected to the switch means of the other channel in a manner to cause momentary closing thereof, and thereby the first signal to arrive at the observation point initiates a time measuring wave, and the second signal to arrive momentarily applies said timing wave to the indicator. The indicator indicates the sense of the wave applied thereto, as well as the magnitude thereof, thereby yielding information of the order of arrival of the signals and the time interval between them.

Further advantages and features of the invention will be appreciated from the detailed description of a particular embodiment thereof which follows, reference being made to the accompanying drawings wherein:

Fig. 2 illustrates typical voltage waves that exist in the circuits of Fig. 1; and Fig. 3 illustrates diagrammatically the arrangement of an observation station.

Figure 1:
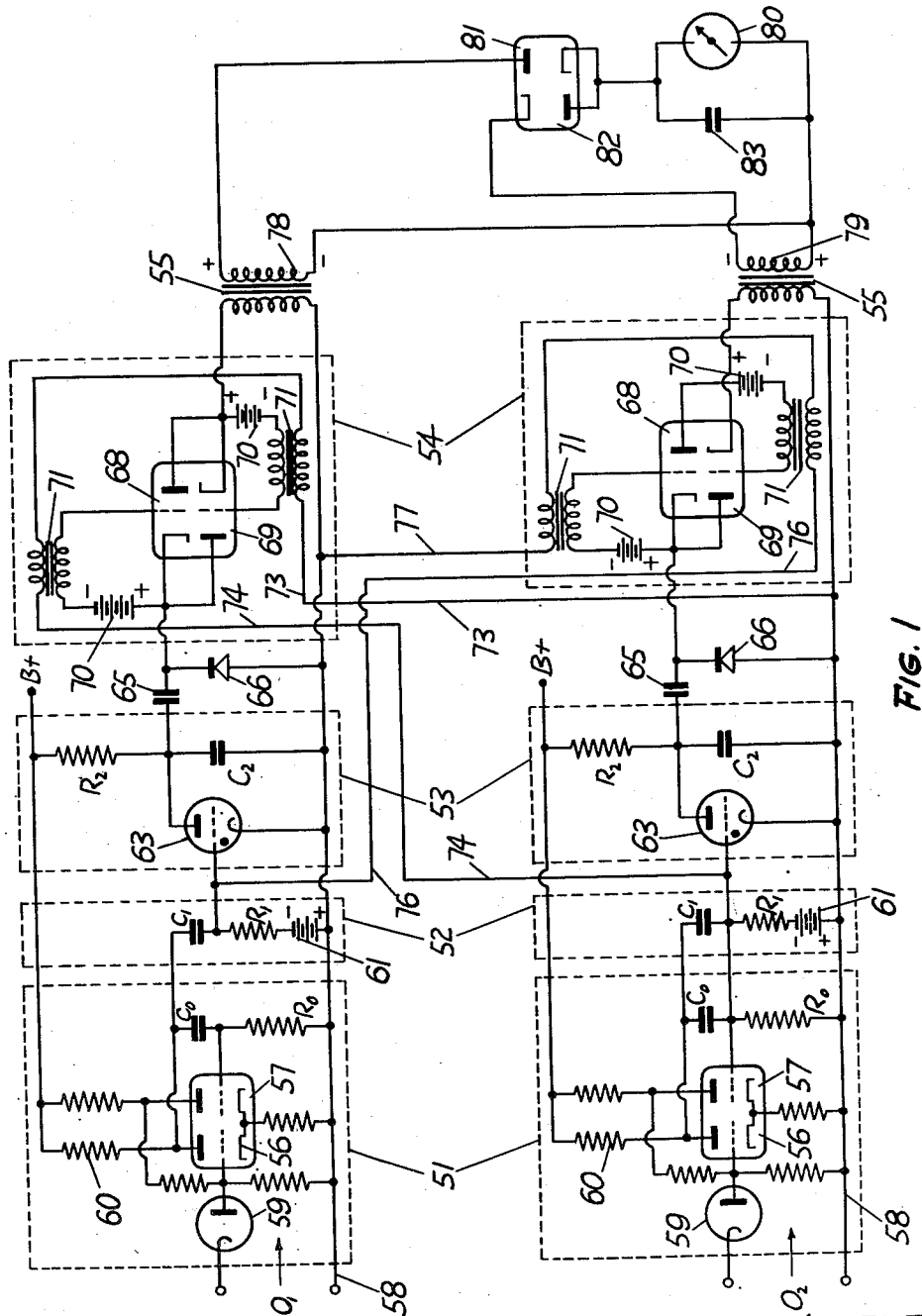
Fig. 1 illustrates a circuit in accordance with the invention.

Referring first to Fig. 3, the observation station is equipped with first and second input elements $I_1$ and $I_2$. These may be adjacent hydrophones, for use in underwater signaling, or adjacent antennas, for use in radio signaling. Waves arriving in a direction perpendicular to the plane P—P will arrive at both input elements simultaneously, and will, therefore, cause similar electrical signals to be generated simultaneously. However, waves arriving in other directions will cause electrical signals to be generated in the input elements $I_1$ and $I_2$ consecutively. The electrical signals may be amplified in similar amplifiers $A_1$ and $A_2$, and provided to outputs $O_1$ and $O_2$, respectively.

The time difference indicator of Fig. 1 employs two identical channels, connected one to output $O_1$ and the other to output $O_2$, in each of which there is generated a single sharp voltage pulse or "spike" in response to the first arrival energy. Each spike initiates a sawtooth voltage wave in its own channel and controls a normally open gate stage in the other channel. The output of the sawtooth voltage stage of each channel is momentarily made available, through the gate circuit of that channel, to a meter into which both channels feed, and which indicates the amount and sense of the time difference. Since both signal channels are identical, one will be described and the same reference characters are applied to like parts of each.

Each signal channel comprises a single-pulse multivibrator 51, a differentiating circuit 52, a sawtooth sweep generator 53, a gate circuit 54, and an output pulse transformer 55. The multivibrator 51 comprises two triodes 56 and 57, of which the first 56 is arranged to be normally conductive in the absence of signals and the second simultaneously nonconductive. A capacitor $C_0$ is connected from the anode of triode 56 to the control grid of triode 57, and a resistor $R_0$ is connected from that control grid to the common negative bus 58. A diode 59 is provided in the input circuit of the multivibrator and connected so that negative voltages only appear on the control grid of the normally conductive triode 56 in response to input signals. As shown in Fig. 2, at 2A, the signal incident upon $I_1$ or $I_2$ may consist, for example, of a first arrival pulse of oscillations of comparatively large amplitude, plus consequential unwanted energy, such as reverberations and the like. The negative portion of this signal, shown at 2B, appears on the grid of triode 56. This cuts off the first triode 56 and the anode thereof becomes suddenly more positive due to the cessation of current flow in the anode resistor 60. The second triode 57 is then rendered conductive through the RC circuit $C_0 R_0$, which has a time constant approximating the duration of the total signal shown at 2A.

which may, for example, be of the order of three seconds. The single pulse that is provided by the multivibrator is shown at 2C, and endures long enough for the reverberations and other unwanted energy to die out. This pulse is taken off at the anode of the first triode 56, and is therefore positive. The negative reverberation energy in 2B that follows the first arrival pulse does not affect the conductive state of the multivibrator except to maintain the first triode nonconductive.

The differentiating circuit 52 comprises a capacitor $C_1$ and a resistor $R_1$ in series. The capacitor $C_1$ is connected to the anode of the first multivibrator triode 56 and the resistor is connected to the negative bus 58 through a battery 61, the purpose of which will be presently explained. The time constant of $C_1R_1$ is very short, for example of the order of 1 millisecond, and a very short positive pulse or "spike" appears across $R_1$ in response to the initiation or leading edge of the multivibrator output pulse. This spike is shown in Fig. 2 at 2D.

The sawtooth generator 53 comprises a gaseous discharge tube 63 which may be a Thyratron, a charging resistor $R_2$ and a charging capacitor $C_2$. The control grid of the tube 63 is connected to the differentiating circuit 52 at the junction of $C_1$ and $R_1$, while the cathode thereof is connected to the common bus 58. The battery 61 is connected to the bus 58 at its positive terminal, and thereby furnishes a negative bias to the tube 63, maintaining the tube nonconductive in the absence of signals. The time constant of the circuit $R_2C_2$ is comparable to that of $R_0C_0$, and may again be of the order of three seconds so that the capacitor $C_2$ is charged to the steady state value prior to the arrival of a spike from the differentiator 52. When it arrives, the spike renders the gas tube 63 momentarily conductive, the capacitor $C_2$ is substantially instantaneously discharged through the tube, and a charging cycle commences almost immediately, for the spike is very short. Thus a sawtooth voltage wave is provided in response to the spike, as shown in Fig. 2, at 2E. The sawtooth voltage wave is provided to the output transformer 55 through a coupling capacitor 65 and the gate circuit 54.

The coupling capacitor 65 isolates the stages of the channel that follow the sawtooth generator 53 from the B+ supply. A unidirectional conductor 66 is connected across the output of the sawtooth voltage generator, on the isolated side of the channel. This conductor is connected in opposition to the normal B+ supply, so that, when the gas tube 63 is nonconductive, it does not interfere with the normal charging of the capacitor $C_2$, but when the tube conducts, it prevents $C_2$ from charging in the reverse direction by short-circuiting reverse charging current surges. It thus functions as a "D. C. restorer"; that is, it prevents the sweep voltage from swinging below the zero level during the discharge of the sweep capacitor $C_2$. The sweep voltage that is available to the gate circuit is shown in Fig. 2, at 2F. This sweep voltage starts at the zero level, which is the level of the bus 58.

The gate circuit 54 is described in detail and claimed in copending application Serial No. 788,811, filed November 29, 1947, now Patent No. 2,496,900, dated February 7, 1950, and comprises a pair of triode sections 68 and 69 reversely connected in parallel in the input circuit of the transformer 55. Each section is biased to cut-off by a battery 70, and is provided with a control transformer 71. The battery 70 and the secondary of the transformer 71 are in each section connected together in series between the grid and cathode. The two primary windings of the transformers 71 of one channel are connected in series across the resistor $R_1$ of the differentiating circuit 52 of the other signal channel. The connections from the gate of the $O_1$ channel are via wires 73 and 74 to the differentiating circuit of the $O_2$ channel, and the connections from the gate of the $O_2$ channel are via wires 76 and 77 to the differentiating circuit of the $O_1$ channel. Thus the $O_1$ channel has its gate controlled by the spike from the $O_2$ channel, and the $O_2$ channel has its gate controlled by the spike from the $O_1$ channel.

The secondary windings 78 and 79 of the output pulse transformers of the $O_1$ and $O_2$ channels respectively are connected to a meter 80 of the type wherein the needle is centered in the absence of a deflection current, and is deflected to one side or the other depending on the direction of the current that flows through it. The two secondary windings 78 and 79 are so phased relative to each other that their output signals tend to deflect the meter needle in opposite directions, and each is connected to the meter through a unidirectional conductor or rectifier 81 or 82, respectively. The rectifiers provide unidirectional currents from the outputs of their respective pulse transformers 55, and since these currents are applied in the opposite sense to the meter 80, there is available to the meter the desired information about both sense and amplitude. A stabilizing capacitor 83 is provided in parallel with the meter.

If the two first arival signals in each of the input elements $I_1$ and $I_2$ arrive in sequence, one is fed through $O_1$ to one channel, while the other is fed through $O_2$ to the other channel. The differentiator spike (Fig. 2D) which corresponds to the first signal opens the gate 54 of the channel of the second signal, but since $C_2$ of the second signal channel is in the steady state and its potential is isolated by capacitor 65, there is no output through the opened gate, and the meter 80 is not affected. This same spike, however, starts the sawtooth wave in its own signal channel. Thereafter, the differentiator spike from the channel of the second signal opens the gate of the channel of the first signal, and a spike having a peak potential which is determined by the then-existing level of the sawtooth voltage in the channel of the first signal is applied to the meter 80. Thus, the potential of only one of the sawtooth waves is applied to the meter, namely, that which comes from the signal channel carrying the first signal received, and the voltage level at which it is applied is determined by the time difference between the two signals in $I_1$ and $I_2$. If the two signals are received simultaneously, both spikes will occur simultaneously and no deflection voltage will be applied to the meter, which is what is desired.

Many modifications and variations of the invention will occur to those who are skilled in the art, and it is, therefore, intended that the claims which follow shall not be limited by the particular details of the embodiment which is illustrated and described herein, but only by the prior art.

What is claimed is:

1. Apparatus for indicating the difference in the times of arrival of two consecutive signals at a point of observation comprising means for converting said signals into electrical impulses, means for separating the impulses corresponding to each signal into two separate channels, means in each channel for producing a single sharp voltage impulse corresponding to the arrival of the earliest portion of the signal in said channel, sweep generating means in each channel adapted to initiate a sweep voltage wave in response to said sharp impulses, normally closed gate circuit means in each channel following the sweep circuit means and adapted to be momentarily opened by the sharp impulse of the other channel, a circuit connection from the impulse producing means of each channel to the gate circuit means of the other channel, an indicating device, and means connecting the output of each sweep generating means independently to said device through the gate circuit means in its own channel.

2. Apparatus for indicating the time interval between two electrical impulses comprising first and second sweep generators, an indicator, first and second normally open switch means connected between said first and second generators, respectively, and said indicator, first electrical impulse means adapted to furnish one of said impulses and second electrical impulse means adapted to furnish the other of said impulses, circuit means connected from said first impulse means to said first generator and second switch means for applying said one of said impulses to said first generator and said second switch means, and circuit means connected from said second impulse means to said second generator and first switch means for applying said other of said impulses to said second generator and said first switch means, each impulse being operable momentarily to initiate the sweep wave of the generator and simultaneously to close the switch to which it is applied.

STANLEY R. RICH.

REFERENCES CITED

The following references are of record in the file of this patent:

UNITED STATES PATENTS

| Number | Name | Date |
|---|---|---|
| 2,250,708 | Herz | July 29, 1941 |
| 2,406,316 | Blumlein et al. | Aug. 27, 1946 |
| 2,426,910 | Wilson | Sept. 2, 1947 |
| 2,445,584 | Ramo | July 20, 1948 |